United States Patent
Asano et al.

(10) Patent No.: US 7,168,073 B2
(45) Date of Patent: Jan. 23, 2007

(54) PROGRAM DISTRIBUTION SYSTEM FOR DISCARDING PROGRAM ON RECEPTION TERMINAL SIDE

(75) Inventors: Takashi Asano, Kadoma (JP); Nobuki Tominaga, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 710 days.

(21) Appl. No.: 10/314,219

(22) Filed: Dec. 9, 2002

(65) Prior Publication Data

US 2003/0131046 A1  Jul. 10, 2003

(30) Foreign Application Priority Data

Jan. 9, 2002  (JP)  ............................. 2002-001989

(51) Int. Cl.
   G06F 9/445  (2006.01)
   G06F 9/44   (2006.01)
(52) U.S. Cl. .................. 717/176; 717/177; 709/203
(58) Field of Classification Search ........ 717/174–178; 709/203
   See application file for complete search history.

(56) References Cited

U.S. PATENT DOCUMENTS

| | | | | |
|---|---|---|---|---|
| 5,724,345 | A * | 3/1998 | Guarneri et al. | 370/316 |
| 5,764,992 | A * | 6/1998 | Kullick et al. | 717/170 |
| 5,886,991 | A * | 3/1999 | Guarneri et al. | 370/389 |
| 6,199,204 | B1 * | 3/2001 | Donohue | 717/178 |
| 6,289,512 | B1 | 9/2001 | Edwards et al. | |
| 6,298,480 | B1 | 10/2001 | Beuk et al. | |
| 6,301,710 | B1 * | 10/2001 | Fujiwara | 717/175 |

(Continued)

FOREIGN PATENT DOCUMENTS

EP  0 778 512  6/1997

(Continued)

OTHER PUBLICATIONS

Stoller et al, "Transformation for model checking distributed Java programs", ACM Proc. of 8th Int. SPin workshop on model checking of SW, pp. 192-199, 2001.*

(Continued)

Primary Examiner—Anil Khatri
(74) Attorney, Agent, or Firm—Wenderoth, Lind & Ponack, L.L.P.

(57) ABSTRACT

A program distribution system capable of discarding a distributed program according to the properties of the program is provided. In the program distribution system, a program is distributed from a program transmission apparatus to a program reception terminal over a network. The program transmission apparatus includes a transmission processing section. The program reception terminal includes a reception-side storage section and a discard processing section. The transmission processing section transmits a program and discarding procedure information to the program reception terminal. The discarding procedure information relates to a procedure of discarding the program performed by the program reception terminal. The reception-side storage section stores the program transmitted from the transmission processing section. The discard processing section discards the program stored in the reception-side storage section according to a discarding procedure specified by the discarding procedure information transmitted from the transmission processing section.

16 Claims, 11 Drawing Sheets

U.S. PATENT DOCUMENTS

| | | | |
|---|---|---|---|
| 6,332,025 B2 * | 12/2001 | Takahashi et al. | 380/281 |
| 6,343,373 B1 * | 1/2002 | Koizumi et al. | 717/146 |
| 6,397,378 B1 * | 5/2002 | Grey et al. | 717/175 |
| 6,408,434 B1 * | 6/2002 | Fujiwara | 717/170 |
| 6,493,871 B1 * | 12/2002 | McGuire et al. | 717/173 |
| 6,535,911 B1 * | 3/2003 | Miller et al. | 709/217 |
| 6,611,957 B2 * | 8/2003 | Ebisawa | 717/173 |
| 6,687,901 B1 * | 2/2004 | Imamatsu | 717/173 |
| 6,772,192 B1 * | 8/2004 | Fulton et al. | 709/203 |
| 6,775,830 B1 * | 8/2004 | Matsunami et al. | 717/176 |

FOREIGN PATENT DOCUMENTS

| | | |
|---|---|---|
| GB | 2 346 716 | 8/2000 |
| JP | 4-184625 | 7/1992 |
| JP | 10-161856 | 6/1998 |
| JP | 2000-112717 | 4/2000 |
| JP | 2000-207216 | 7/2000 |
| JP | 2001-282527 | 10/2001 |

OTHER PUBLICATIONS

Xiao et al, "Distributed admission control for power controlled wireless systems", IEEE Trans. on networking vol. 9, No. 6, pp. 790-800, 2001.*

Mirville et al, "A networke based software distributed system for smaller organizations", ACM Jour. of Computing Scince, vo. 20, issue 2, pp. 311-317, 2004.*

Romberg et al, Loose synchronization of event triggred networks for distibution of synchronous programs, ACM EMSOFT, pp. 193-202, 2004.*

W. Van Belle et al., "Experiences in Mobile Computing: The CBorg Mobile Multi-Agent System", Proceedings "Technology of Object-Oriented Languages and Systems, 2001. Tools 38. Proceedings, Mar. 12-14, 2001", Mar. 12, 2001, pp. 7-18, XP010535937.

T. Farnham et al., "IST-Trust: A Perspective on the Reconfiguration of Future Mobile Terminals Using Software Download", Proceedings "Personal, Indoor and Mobile Radio Communications, 2000. PIMRC 2000.", vol. 2, Sep. 18, 2000, pp. 1054-1058, XP010520795.

* cited by examiner

F I G. 2

| IDENTIFIER | PARAMETER INFORMATION | DECISION CONDITION | DISCARD CONDITION |
|---|---|---|---|
| a | ONE (INTEGER) | ONCE A DAY | PREDETERMINED PERIOD LAPSES AFTER RECEPTION |
| b | ONE (INTEGER) | IMMEDIATELY AFTER PROGRAM IS STARTED | EXECUTED PREDETERMINED NUMBER OF TIME OF EXECUTION AFTER RECEPTION |
| c | NONE | IMMEDIATELY AFTER PROGRAM IS TERMINATED | EXECUTED PREDETERMINED NUMBER OF TIME OF EXECUTION AFTER RECEPTION AND USER'S APPROVAL |
| Z | NONE | UPON USER'S INSTRUCTION | USER'S APPROVAL |

FIG. 3

| IDENTIFIER | PARAMETER INFORMATION | DECISION CONDITION | DISCARD CONDITION |
|---|---|---|---|
| a | ONE (INTEGER) | ONCE A DAY | PREDETERMINED PERIOD LAPSES AFTER RECEPTION |
| b | ONE (INTEGER) | IMMEDIATELY AFTER PROGRAM IS STARTED | EXECUTED PREDETERMINED NUMBER OF TIME OF EXECUTION AFTER RECEPTION |
| c | NONE | IMMEDIATELY AFTER PROGRAM IS TERMINATED | EXECUTED PREDETERMINED NUMBER OF TIME OF EXECUTION AFTER RECEPTION AND USER'S APPROVAL |
| d | NONE | IMMEDIATELY AFTER PROGRAM IS TERMINATED | GOING OUT OF PREDETERMINED AREA |
| Z | NONE | UPON USER'S INSTRUCTION | USER'S APPROVAL |

FIG. 5

| a (10DAYS) | b (10) | c (1) |
|---|---|---|
| 1 | 0 | 1 |

FIG. 6

| TERMINAL TYPE | PROGRAM |
|---|---|
| ALL | PROGRAM A |
| TYPE I | PROGRAM B<br>PROGRAM C |
| TYPE II | PROGRAM D |
| TYPE III | PROGRAM E |

PROGRAM DISTRIBUTION SYSTEM FOR DISCARDING PROGRAM ON RECEPTION TERMINAL SIDE

BACKGROUND OF THE INVENTION

1. Field of the Invention

The present invention relates to program distribution systems, and more specifically, to a program distribution system in which a receiver terminal side discards a received program.

2. Description of the Background Art

In program distribution services that have become available in recent years, not only text data, image data, sound data, etc., but also applications (programs) can be distributed among communications devices over a network. With the distribution of programs, these services can add a new function to receiver terminals, providing functional enhancement thereto. In such program distribution services, JAVA™, is now widely used to achieve a program execution environment independent of any platform. Specifically, a JAVA™ program called an Applet is distributed from a Web server to a Web client over the Internet, and the distributed JAVA™ program is activated on a Web client's terminal. Such JAVA™ program distribution services have also been available for small-sized handheld terminals such as cell phones having a Web browser installed therein.

Furthermore, a system for automatic program distribution has been suggested. In one exemplary system, programs and data are automatically distributed (downloaded) to a mobile terminal that enters a service area.

In such an automatic program distribution system, the distributed programs are always stored in storage areas of a receiver terminal. Consequently, repeated program distribution reduces vacant space of the storage areas, and thus a program that is larger than the vacant space cannot possibly be stored when it is distributed. This is a serious problem especially when the receiver terminal is a cell phone, for example. Therefore, a resource constraint receiver terminal is required.

There is yet another problem in the above automatic program distribution system. In this system, the distributed programs are automatically stored in the receiver terminal without making a user aware of the fact of such storing. Consequently, the user is unaware of the fact that vacant space of the storage areas is being reduced, thereby making the receiver terminal incapable of storing any program that is really desired by the user. To avoid the above-mentioned problems, unwanted programs that are distributed and stored in the receiver terminal should be discarded from the storage areas.

However, it is quite burdensome for the user to delete such unwanted programs manually one by one. To ease such burdens, some techniques are suggested in addition to the above-mentioned manual discarding. For instance, there is a first exemplary technique of presenting use situations of the stored programs to the user. This technique can support the user for deleting unwanted programs. In a second exemplary technique, programs that have not been used over a predetermined period are automatically deleted. In a third exemplary technique, programs are automatically and promptly deleted after they are executed. According to these techniques, programs are automatically deleted, thereby easing a burden of deleting programs from the user.

However, these techniques also have some drawbacks. In the first exemplary technique, a process of deleting the program still has to be manually performed by the user. Therefore, the user's burden cannot be completely eased.

Also, in the second and third exemplary techniques, programs are deleted irrespective of the types or properties of these programs. Consequently, in some cases, deletion may be made against the user's will. For example, it is of course not preferable for some programs, such as paid programs, that are executed at the receiver terminal to be deleted only because they have not been used for the predetermined period, or be promptly deleted after being executed. Therefore, what is suggested in the conventional automatic program deletion techniques is merely applying a certain deletion scheme to all programs without taking the types or properties of these programs in consideration, which leads to possible deletion against the user's will. For this reason, these techniques hardly achieve an appropriate deallocation of the storage areas in the receiver terminal.

SUMMARY OF THE INVENTION

Therefore, an object of the present invention is to provide a program distribution system which is capable of carrying out a process of discarding a distributed program according to the properties of the program.

The present invention has the following features to attain the object mentioned above.

A first aspect of the present invention is directed to a program distribution system in which a program executable by a program reception terminal is distributed from a program transmission apparatus to the program reception terminal via a network. The program transmission apparatus includes a transmitting section for transmitting, to the program reception terminal, the program and discarding procedure information related to a discarding procedure for discarding the program. The program reception terminal includes a program storage section for storing the program transmitted from the transmitting section, and a discarding section for discarding the program stored in the program storage section according to the discarding procedure specified by the discarding procedure information transmitted from the transmitting section.

In the first aspect, the program transmitting side can freely change the discarding procedure information according to the program to be distributed. Also, the program receiving side discards the program according to the discarding procedure information. Therefore, the discarding procedure to be applied to the program is appropriately set by the program transmission apparatus, thereby enabling the program receiving side to perform a discarding process according to the properties of the distributed program. Furthermore, with the discarding procedure information appropriately set, it is possible to avoid a situation in which unwanted programs are kept stored in the program reception terminal, thereby enabling efficient use of storage areas in the program reception terminal.

According to a second aspect, in accordance with the first aspect, the discarding procedure information includes a discard condition which is indicative of a condition for discarding the program. Furthermore, the discarding section includes a discard determining section for determining whether or not the discard condition included in the discarding procedure information is satisfied with respect to the program stored in the program storage section, and a discard executing section for executing, when the discard determining section determines that the discard condition is satisfied, a discarding of the program stored in the program storage section.

In the second aspect, the discard condition included in the discarding procedure information can be set at the program transmitting side. With the discard condition set for discarding the program, the discarding procedure to be applied to the program can be easily set.

According to a third aspect, in accordance with the second aspect, the transmitting section wirelessly transmits the program and the discarding procedure information to the program reception terminal that has entered a predetermined area to be able to wirelessly communicate with the program transmission apparatus. Furthermore, the discard condition included in the discarding procedure information transmitted to the program reception terminal is one that is satisfied when the program reception terminal is located outside of the predetermined area.

In the third aspect, in a system where a program that is limited only to a predetermined area is distributed, the program is discarded when the program reception terminal goes out of the predetermined area. The program is required only when the program reception terminal is located within the predetermined area, and is not required when the program reception terminal goes out of the predetermined area. Therefore, by setting the discard condition as "go out of the predetermined area", the discarding procedure can be appropriately set. Also, the program can be discarded when it is not required, thereby enabling efficient use of the storage areas of the program reception terminal.

According to a fourth aspect, in accordance with the third aspect, execution of the program is forced to be terminated when the program reception terminal goes out of the predetermined area, and the discard determining section determines whether or not the program reception terminal is located outside of the predetermined area based on whether the execution of the program is terminated.

In the fourth aspect, the discard condition is determined depending on whether or not the program is terminated. Therefore, it is possible to easily determine whether the discard condition is satisfied, that is, whether the program reception apparatus goes out of the predetermined area.

According to a fifth aspect, in accordance with the second aspect, the discarding procedure information further includes a decision condition for determining whether or not the discard condition is satisfied, and when the decision condition included in the discarding procedure information is satisfied, the discarding determining section determines whether or not the discard condition is satisfied.

In the fifth aspect, not only the discard condition but also the condition for determining whether or not the discard condition is satisfied can be set by the program transmitting side. Therefore, for example, whether the discard condition is satisfied can be determined at appropriate timing, and as a result, the program can be discarded more appropriately.

According to a sixth aspect, in accordance with the fifth aspect, the program reception terminal further includes a program executing section for executing the program stored in the program storage section, and the decision condition includes a condition related to the timing of executing the program by the program executing section.

In the sixth aspect, it is possible to coincide the timing of determining whether or not the discard condition is satisfied with the timing of executing the program. Therefore, the program can be discarded in relation to execution of the program, thereby appropriately discarding the program.

According to a seventh aspect, in accordance with the sixth aspect, the decision condition includes a condition that the program is activated by the program executing section.

In the seventh aspect, the program can be discarded at the time of activating the program.

According to an eighth aspect, in accordance with the sixth aspect, the decision condition includes a condition that execution of the program by the program executing section is terminated.

In the eighth aspect, the program can be discarded at the time of terminating the program.

According to a ninth aspect, in accordance with the second aspect, the discard determining section determines whether or not the discard condition is satisfied at predetermined time intervals.

In the ninth aspect, whether or not the program is discarded is determined at the predetermined time intervals. This can prevent a problem in which, when the discard condition is related to the execution of the program, for example, the program is not discarded until the program is executed even if the discard condition has been satisfied. On the contrary, in the ninth aspect, once the discard condition is satisfied, the program is always discarded within a predetermined time interval. Therefore, it is possible to effectively discard the program even when the program has not been executed.

According to a tenth aspect, in accordance with the second aspect, the discard condition includes a condition related to a lapse of time after the program transmitted from the transmitting section is received by the program reception terminal.

In the tenth aspect, the program receiving side can automatically discard the program when a predetermined time lapses after the program is distributed. With the program being transmitted in relation to the discarding procedure information including a discard condition that the program is discarded when the predetermined time lapses after distribution, it is possible to appropriately discard a program having, for example, a property of being executable only within a predetermined period after distribution.

According to an eleventh aspect, in accordance with the second aspect, the discard condition includes a condition related to the number of times the program transmitted from the transmitting section has been executed by the program reception terminal.

In the eleventh aspect, the program receiving side can automatically discard the distributed program after the distributed program is executed a predetermined number of times. With the program being transmitted in relation to the discarding procedure information including a discard condition that the program is discarded after a predetermined number of times of execution after it is distributed, it is possible to appropriately discard a program having, for example, a property of being executable only within a predetermined number of times of execution after distribution.

According to a twelfth aspect, in accordance with the second aspect, the discard condition includes at least a user's approval of discarding the program. Furthermore, the discard determining section receives the user's approval before the discarding section discards the program and, based on the received user's approval, decides whether or not the discard condition is satisfied.

In the twelfth aspect, programs are not discarded without a user's approval. With a user's approval set as the discard condition for prompting the user to discard the program, it is possible to avoid a situation in which programs that are valuable to the user, such as paid contents, for example are automatically discarded. Therefore, according to the twelfth aspect, a program that may cause damages to the user is not automatically discarded without the user's approval.

According to a thirteenth aspect, in accordance with the first aspect, the discarding procedure information is in a form of a discarding program for causing the program reception terminal to execute the discarding procedure, and the discarding section discards the program by executing the discarding program.

According to a fourteenth aspect, in accordance with the first aspect, the discarding procedure information indicates a procedure identifier given to the discarding procedure for identification. In addition, the program reception terminal also includes a discarding procedure storage section for storing the discarding procedure, and a selecting section for selecting the discarding procedure stored in the discarding procedure storage section based on the procedure identifier transmitted from the transmitting section. Furthermore, the discarding section discards the program according to the discarding procedure selected by the selecting section.

According to a fifteenth aspect, in accordance with the first aspect, the discarding section also includes a default procedure storage section for storing a default discarding procedure that is previously set, a discarding procedure determining section for determining whether or not the discarding procedure indicated by the discarding procedure information transmitted from the transmitting section is to be executed by the program reception terminal. When the discarding procedure determining section determines that the discarding procedure is not to be executed, the discarding section discards the program according to the default discarding procedure stored in the default procedure storage section.

In the fifteenth aspect, even if the program transmitting side has set inappropriate discarding procedure information, the program receiving side can appropriately perform a discarding process. For example, even if the discarding procedure information transmitted from the program transmitting side cannot be executable, the program receiving side can appropriately discard the program.

According to a sixteenth aspect, in accordance with the first aspect, the discarding section also includes a default procedure storage section for storing a default discarding procedure that is previously set, and a discarding procedure determining section for determining whether or not the transmitted program is accompanied with discarding procedure information. When the discarding procedure determining section determines that the transmitted program is not accompanied with discarding procedure information, the discarding section discards the program according to the default discarding procedure stored in the default procedure storage section.

In the sixteenth aspect, even when the program is not accompanied with discarding procedure information, the program reception side can appropriately discard the program.

A seventeenth aspect of the present invention is directed to a program reception terminal which is capable of executing a program distributed from a program transmission apparatus via a network. The program reception terminal includes a receiving section for receiving a program and discarding procedure information related to a discarding procedure for discarding the program in the program reception terminal. In addition, the program reception terminal also includes a program storage section for storing the program received by the receiving section, and a discarding section for discarding the program stored in the program storage section according to the discarding procedure specified by the discarding procedure information received by the receiving section.

An eighteenth aspect of the present invention is directed to a program transmission apparatus for transmitting a program executable by a program reception terminal from the program transmission apparatus to the program reception terminal via a network. The program transmission apparatus includes a program storage section for storing the program to be executed by the program reception terminal, and a discarding procedure information storage section for storing discarding procedure information related to a discarding procedure to be performed by the program reception terminal for discarding the program. Furthermore, the program transmission apparatus includes a transmitting section for transmitting, to the program reception terminal, the program stored in the program storage section and the discarding procedure information stored in the discarding procedure information storage section.

A nineteenth aspect of the present invention is directed to a program to be transmitted, together with a computer-executable program to be executed by a computer of a program reception terminal, from a program transmission apparatus to the program reception terminal via a network, and to cause a computer of the program reception terminal to execute a procedure including discarding the computer-executable program.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustration showing an exemplary list of discarding procedure information in the present embodiment;

FIG. 3 is the illustration shown in FIG. 2 with another piece of discarding procedure information added thereto;

FIG. 5 is an illustration showing an exemplary second field expanded from the relational information shown in FIG. 4;

FIG. 6 is an illustration showing exemplary receiver information in the present embodiment;

DETAILED DESCRIPTION OF THE PREFERRED EMBODIMENT

Figure 1:
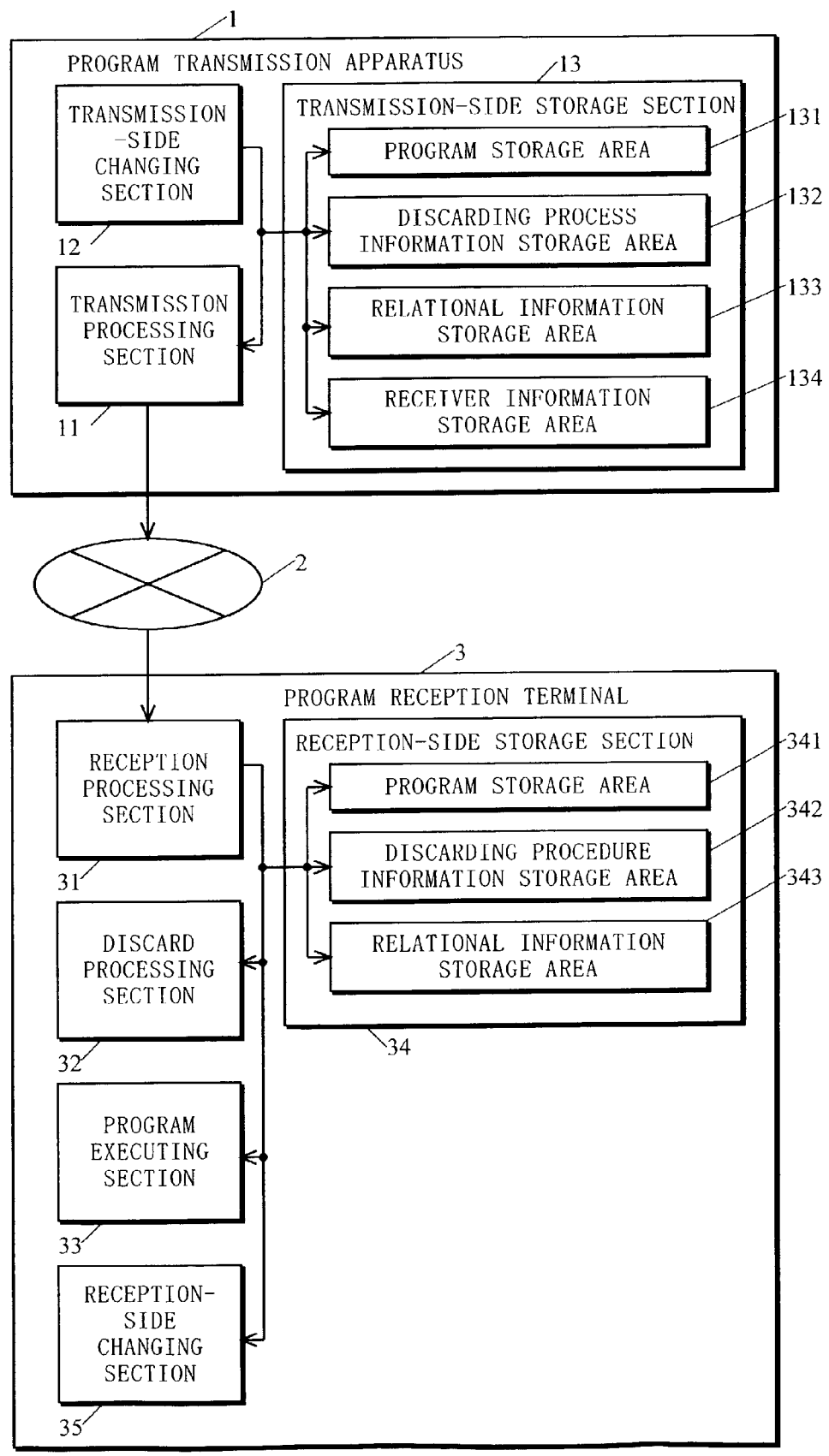
FIG. 1 is a block diagram illustrating the configuration of a program distribution system according to one embodiment of the present invention.

FIG. 1 is a block diagram illustrating the configuration of a program distribution system according to one embodiment of the present invention. In FIG. 1, the program distribution system includes a program transmission apparatus (server) 1 and a program reception terminal 3. The program transmission apparatus 1 and the program reception terminal 3 can communicate with each other over a wired or wireless network 2. Typically, the program transmission apparatus 1 is a program distribution server for providing a program distribution service, and the program reception terminal 3 is a terminal for using the service. The program reception terminal 3 is, for example, a personal computer, a cell phone, a PDA, or the like, used by the user. Note that, in FIG. 1, only one terminal is exemplarily illustrated, but a plurality of terminals may be provided to construct the program distribution system.

In FIG. 1, the program transmission apparatus 1 sends a program and its discarding procedure information to the program reception terminal 3 over the network 2. Here, the program is a program which is executable by the program reception terminal 3. The program is distributed from the program transmission apparatus 1 to the program reception terminal 3. The discarding procedure information relates to a discarding procedure for discarding the program at the program reception terminal 3 side. The program reception terminal 3 discards the program received from the program transmission apparatus 1 based on the discarding procedure information. Note that, when a plurality of terminals are provided, transmission of the program and the discarding procedure information may be carried out to some or all terminals simultaneously, or to each terminal separately.

As illustrated in FIG. 1, the program transmission apparatus 1 is implemented by a computer for executing a predetermined program, including a transmission processing section 11, a transmission-side changing section 12, and a transmission-side storage section 13. Specifically, the transmission processing section 11 and the transmission-side changing section 12 are implemented by a CPU of the program transmission apparatus 1 performing a predetermined program operation (refer to FIG. 7). Also, the transmission-side storage section 13 may be a storage medium incorporated in the program transmission apparatus 1, or an external storage medium that is accessible from the program transmission apparatus 1. The transmission processing section 11 performs transmission processing for transmitting the program and the discarding procedure information to the program reception terminal 3. The transmission-side storage section 13 stores various types of information including the program and the discarding procedure information, which are described further below in detail. The transmission-side changing section 12 changes the various information stored in the transmission-side storage section 13. A service provider that distributes the program uses an input device (not shown) included in the program transmission apparatus 1 to provide the transmission-side changing section 12 with an instruction related to changing of various information. With this, the various information stored in the transmission-side storage section 13 can be changed.

The program reception terminal 3 includes a reception processing section 31, a discard processing section 32, a program executing section 33, a reception-side storage section 34, and a reception-side changing section 35. The reception processing section 31 receives the program and the discarding procedure information transmitted from the program transmission apparatus 1. The reception processing section 31 also causes the reception-side storage section 34 to store the received program and discarding procedure information. The discard processing section 32 discards the program stored in the reception-side storage section 34 according to the discarding procedure indicated by the discarding procedure information stored in the reception-side storage section 34. That is, the discarding procedure defines the discard process for deleting the program from the storage area of the program reception terminal 3. The program executing section 33 executes the program stored in the reception-side storage section 34. The reception-side storage section 34 is implemented by a storage medium incorporated in the program reception terminal 3, and stores various types of information including the program and the discarding procedure information, which are described further below in detail. The reception-side changing section 35 follows an instruction entered by the user through an input section (not shown) included in the program reception terminal 3 to change various information stored in the reception-side storage section 35. With this, the user can change the discard procedure information so as to have desired contents. The reception processing section 31, the discard processing section 32, and the program executing section 33 are implemented by a CPU of the program reception terminal 3 executing a predetermined program operation (refer to FIGS. 8 through 12).

Figure 4:
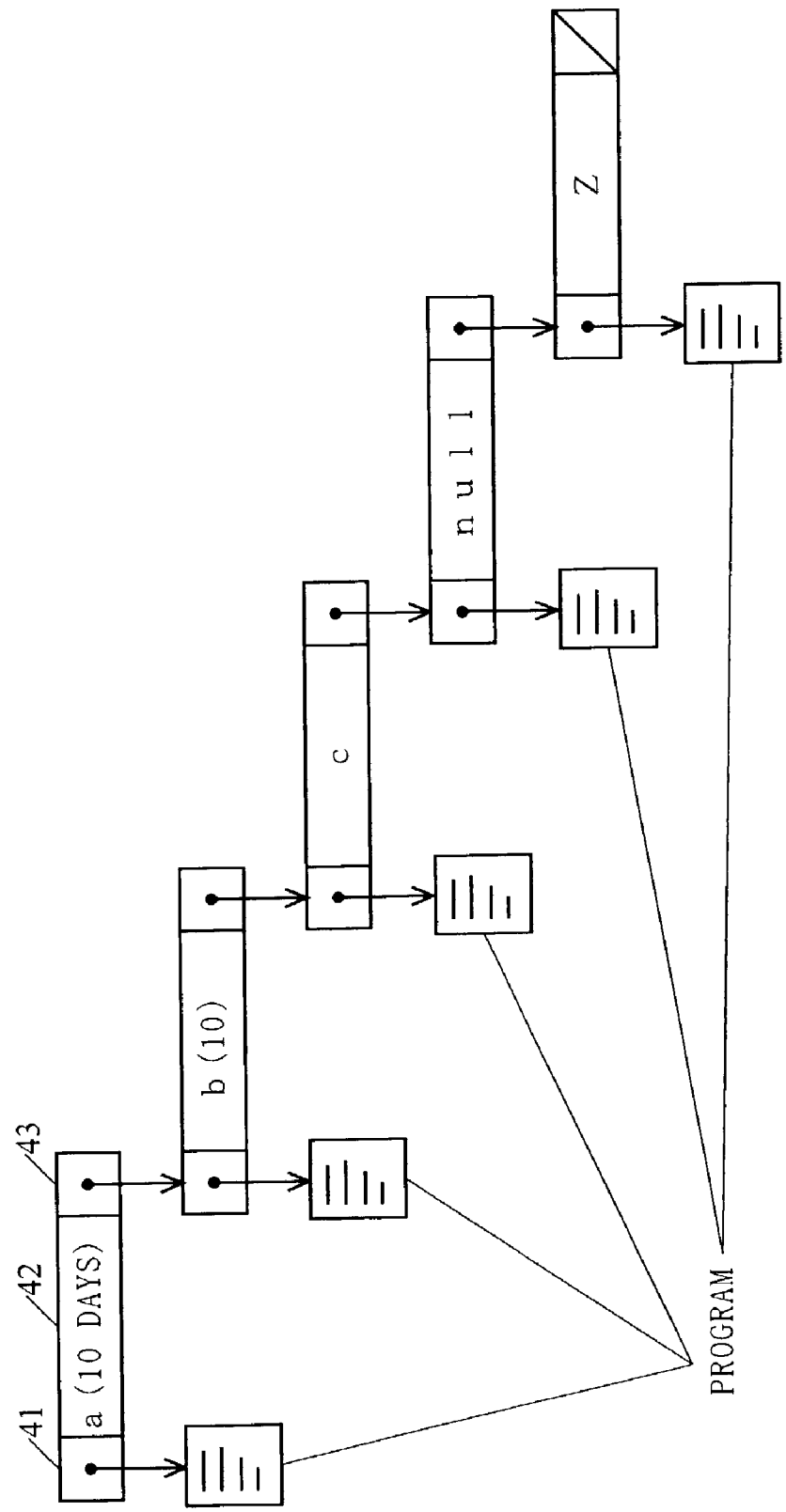
FIG. 4 is an illustration showing exemplary relational information.

The various types of information stored in the transmission-side storage section 13 and the reception-side storage section 34 are described below. The transmission-side storage section 13 includes a program storage area 131, a discarding procedure information storage area 132, a relational information storage area 133, and a receiver information storage area 134. The reception-side storage section 34 includes a program storage area 341, a discarding procedure information storage area 342, and a relational information storage area 343. The program storage areas 131 and 341 are areas for storing programs which are executable by the program reception terminal 3. The discarding procedure information storage areas 132 and 342 are areas for storing discarding procedure information indicating a discarding procedure. Exemplary discarding procedure information is illustrated in FIGS. 2 and 3. The relational information storage areas 133 and 343 are areas for storing relational information. The relational information is information that relates the program with the discarding procedure information for use to discard the program. Exemplary relational information is illustrated in FIG. 4. The receiver information storage area 134 is an area for storing receiver information. The receiver information is information that relates the program with a terminal(s) to which the program is to be transmitted. Based on the receiver information, the program transmission apparatus 1 determines which program is to be transmitted to which terminal. Exemplary receiver information is illustrated in FIG. 5.

FIG. 2 is an illustration showing an exemplary list of discarding procedure information in the present embodiment. In FIG. 2, each piece of discarding procedure information includes a discard condition, a decision condition, an identifier, and parameter information. The discard condition defines a condition for discarding the program, such as a lapse of a predetermined period after the program is received and a predetermined number of times of executing the program. Alternatively, the discard condition may be a user's approval. The decision condition indicates, for example, predetermined time intervals at which it is decided whether or not the discard condition is satisfied, such as "once a day". In another example, the decision condition indicates a predetermined timing at which it is decided whether or not the discard condition is satisfied, such as "immediately after the program is started" or "immediately after the program is terminated". When the decision condition is "once a day", the program reception terminal 3 decides once a day whether or not the discard condition is satisfied. When the decision condition is "immediately after the program is started", the program reception terminal 3 decides whether or not the discard condition is satisfied immediately after the program is started. As such, the discarding procedure is defined by the discard condition and the decision condition in the present embodiment. The identifier is to identify the discarding procedure. Therefore, the identifier has a one-to-one relation with a set of conditions made up of the discard condition and the decision condition. The parameter information indicates the number of parameters and their type (integer, for example), which are required to be set in the discard condition. These parameters relate to the discard condition. More specifically, the parameters are values such as a numerical value indicating a lapsed period if so defined in the discard condition, and a numerical value indicating the number of times of execution if so defined therein.

In FIG. 2, a discarding procedure with an identifier "a" corresponds to a discard condition where the program is discarded when a predetermined period lapses after the program reception terminal 3 downloads (receives) the program. In this case, a lapse of the period after downloading should be monitored, and therefore the corresponding decision condition is set so that the decision is made regularly. A discarding procedure with an identifier "b" is suited for programs such as those that are not required after a specific number of times of execution. In a discarding procedure with an identifier "c", the program is not automatically discarded at the program reception terminal 3 side without a user's approval. Thus, since the program is never discarded without the user's awareness, this discarding procedure is suited for paid contents. Assume in the present embodiment that a discarding procedure with an identifier "Z" is a default discarding procedure. That is, the default discarding procedure is carried out as follows: upon receipt of an instruction from the user, deciding whether the program should be discarded; and, when the user issues an instruction approving of discarding, discarding the program.

Note that, in the present embodiment, the discarding procedure information transmitted from the program transmission apparatus 1 to the program reception terminal 3 can be either one of the following two types: a program for causing the program reception terminal 3 to execute the discarding procedure (such a program is hereinafter referred to as a "discarding program"), and merely information for identifying discarding procedure information containing a discarding procedure (such information is hereinafter referred to as "ID information"). When the discarding procedure information is a discarding program, what is transmitted from the program transmission apparatus 1 to the program reception terminal 3 is the discarding program. The discarding program is transmitted together with the program that is executable by the program reception terminal 3. Also, the discarding program causes the program reception terminal 3 to execute a procedure for discarding the program stored in the program reception terminal 3. That is, the process of discarding the program is performed by the program reception terminal 3 executing the discarding program received from the program transmission apparatus 1. Preferably, the discarding program is independent from the architecture of the program reception terminal 3 that carries out the discarding procedure, such as a JAVA™ program. Also, the discarding program may separately include a program for determining the decision condition and a program for determining the discard condition.

When the discarding procedure information is ID information, on the other hand, what is transmitted from the program transmission apparatus 1 to the program reception terminal 3 is the ID information. Here, the program reception terminal 3 previously holds a program for a discarding process and discarding procedure information. The program is discarded at the time of executing the program for the discarding process by referring to the discarding procedure information specified by the ID information. Note that, in the present embodiment, the parameter values are also transmitted together with the ID information from the program transmission apparatus 1 to the program reception terminal 3. Here, in another embodiment, the parameter values may be stored in advance at the program reception terminal 3 side together with the decision condition, and only the ID information may be received by the program reception terminal 3.

The discarding procedure information stored in the discarding procedure information storage area 342 of the reception-side storage section 34 is added with new discarding procedure information received from the program transmission apparatus 1. FIG. 3 is the illustration shown in FIG. 2 with another piece of discarding procedure information added thereto. In FIG. 3, a discarding procedure with an identifier "d" is added.

FIG. 4 is an illustration showing exemplary relational information. The relational information relates the program to the corresponding discarding procedure. In the present embodiment, the relational information has a list structure that is composed of a cell having three fields. A first field (a field 41, for example) contains information for specifying the program, such as address information indicating a location of the program, a name of the program, etc. A second field (a field 42, for example) contains discarding procedure information. In the example of FIG. 4, the identifier and, as required, the parameter are set in the second field. In the example of FIG. 4, the discarding procedure information contained in the field 42 includes the identifier "a" and the parameter "ten days". Therefore, also with reference to FIG. 2, the program 44 is discarded ten days after the program 44 is received by the program reception terminal 3. Note that the second field may not contain any values (illustrated as "null" in FIG. 4). This means that the program contained in the first field has no corresponding discarding procedure information. A third field (a field 43, for example,) contains reference information about the next cell.

To represent discarding procedure information, the second field may contain a plurality of discarding procedures and their priorities. FIG. 5 is an illustration showing an exemplary second field of the relational information extended from the relational information shown in FIG. 4. This second field can contain a plurality of discarding procedures and their priorities. Here, priorities indicate which discarding procedure has priority for use. In the example of FIG. 5, three discarding procedures with identifiers "a", "b", and "c", respectively, are set. The discarding procedure with the identifier "a" has priority "1"; the discarding procedure with the identifier "b" has priority "0"; and the discarding procedure with the identifier "c" has priority "1". Here, priority "1" is higher in priority than priority "0". Here, the program reception terminal 3 selects either of the discarding procedure with identifier "a" and the discarding procedure with identifier "c" for performing discard processing. In the present embodiment, if two discarding procedures have the same priority level or no discarding procedures have priority, the discarding procedure to be used is determined by the user. In another embodiment, the discarding procedure may be determined according to predetermined criteria set in the program reception terminal 3.

FIG. 6 is an illustration showing exemplary receiver information according to the present embodiment. In FIG. 6, terminal types and programs are related to each other. For example, a program A is transmitted to all types of terminals. Programs B and C are transmitted to terminals of type I. Here, the terminal types indicate, for example, models of terminals, groups depending on users of the terminals, etc.

Figure 7:
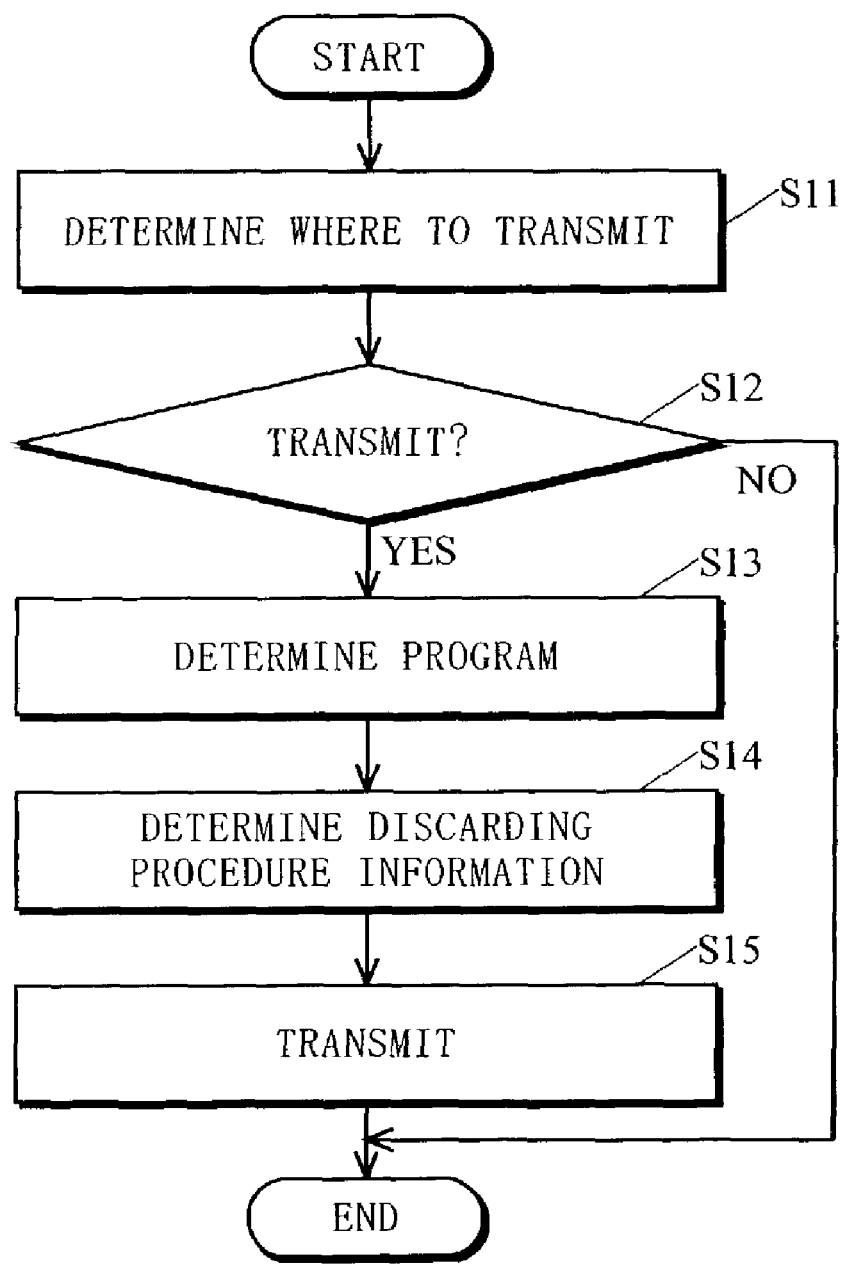
FIG. 7 is a flowchart showing a program transmitting process which is carried out by a program transmission apparatus 1 according to the present embodiment.

The operation of the program distribution system according to the present embodiment is described below. FIG. 7 is a flowchart showing a program transmitting process which is performed by the program transmission apparatus 1 according to the present embodiment. First, the transmitting processing section 11 determines to which terminal the program is to be sent (step S11). Typically, in the determination of step S11, the terminal which is determined to receive the program is a terminal that issued a request to the program transmission apparatus 1 for transmitting the program, or a terminal that is designated by a program distributor managing the program transmission apparatus 1. However, this is not meant to be restrictive. In step S11, the transmission processing section 11 receives information about the determined terminal (program reception terminal). The information about the reception terminal includes, for example, network identification information and the type of the terminal. In addition to the information about the program reception terminal, the program transmission apparatus 1 may receive information indicative of the program requested by the program reception terminal. In the present embodiment, the terminal type is obtained from the program reception terminal 3 (refer to FIG. 6).

Based on the terminal type of the program reception terminal 3 obtained in step S11, the transmission processing section 11 determines whether or not the program reception terminal 3 is a terminal to receive a program (hereinafter referred to as a target terminal) (step S12). The determination in step S12 is made by using the receiver information stored in step S11. That is, if the terminal type obtained in step S11 is included in the receiver information, it is determined that the program reception terminal 3 is a target terminal. On the other hand, if the terminal type obtained in step S11 is not included in the receiver information, the transmission processing section 11 determines that the program reception terminal 3 is not a receiver terminal, and terminates the program transmitting process. In this case, no program is sent to the program reception terminal 3.

If it is determined in step S12 that the program reception terminal 3 is a target terminal, the transmission processing section 11 determines which program is to be sent to the program reception terminal 3 (step S13). This determination is made by using the receiver information stored in the transmission-side storage section 34. For example, with reference to FIG. 6, if the terminal type obtained in step S11 indicates type II, the program to be sent is the program D.

Following step S13, the transmission processing section 11 determines which discarding procedure information corresponds to the program to be sent (step S14). This determination is made based on the relational information stored in the transmission-side storage section 34. Finally, the transmission processing section 11 transmits the program determined in step S13 and the discarding procedure information determined in step S14 to the program reception terminal 3 (step S15), and ends the program transmitting process. Note that the program and discarding procedure information sent in step S15 have been stored in the transmission-side storage section 34.

Figure 8:
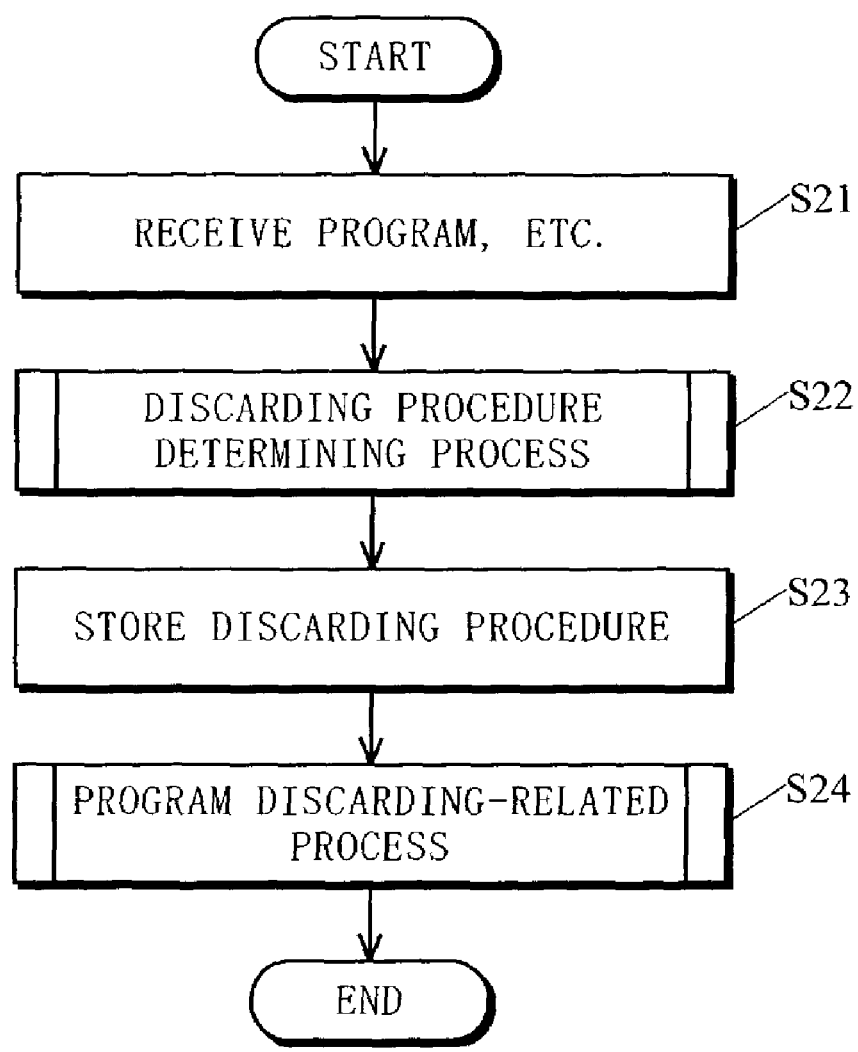
FIG. 8 is a flowchart showing a program receiving process which is carried out by a program reception terminal 3 according to the present embodiment.

FIG. 8 is a flowchart showing a program receiving process which is performed by the program reception terminal 3 according to the present embodiment. First, the reception processing section 31 receives the program and the discarding procedure information sent from the program transmission apparatus 1 (step S21). Note that, in the following, a case where the discarding procedure information with identifier "a" has been received is exemplarily described.

Following step S21, a discarding procedure determination process is performed (step S22). As described above, the program sent from the program transmission apparatus 1 may have a plurality of pieces of discarding procedure information. The discarding procedure determination process in step S22 is to determine which discarding procedure information is to be used for a discarding process, and is described below in detail.

Figure 9:
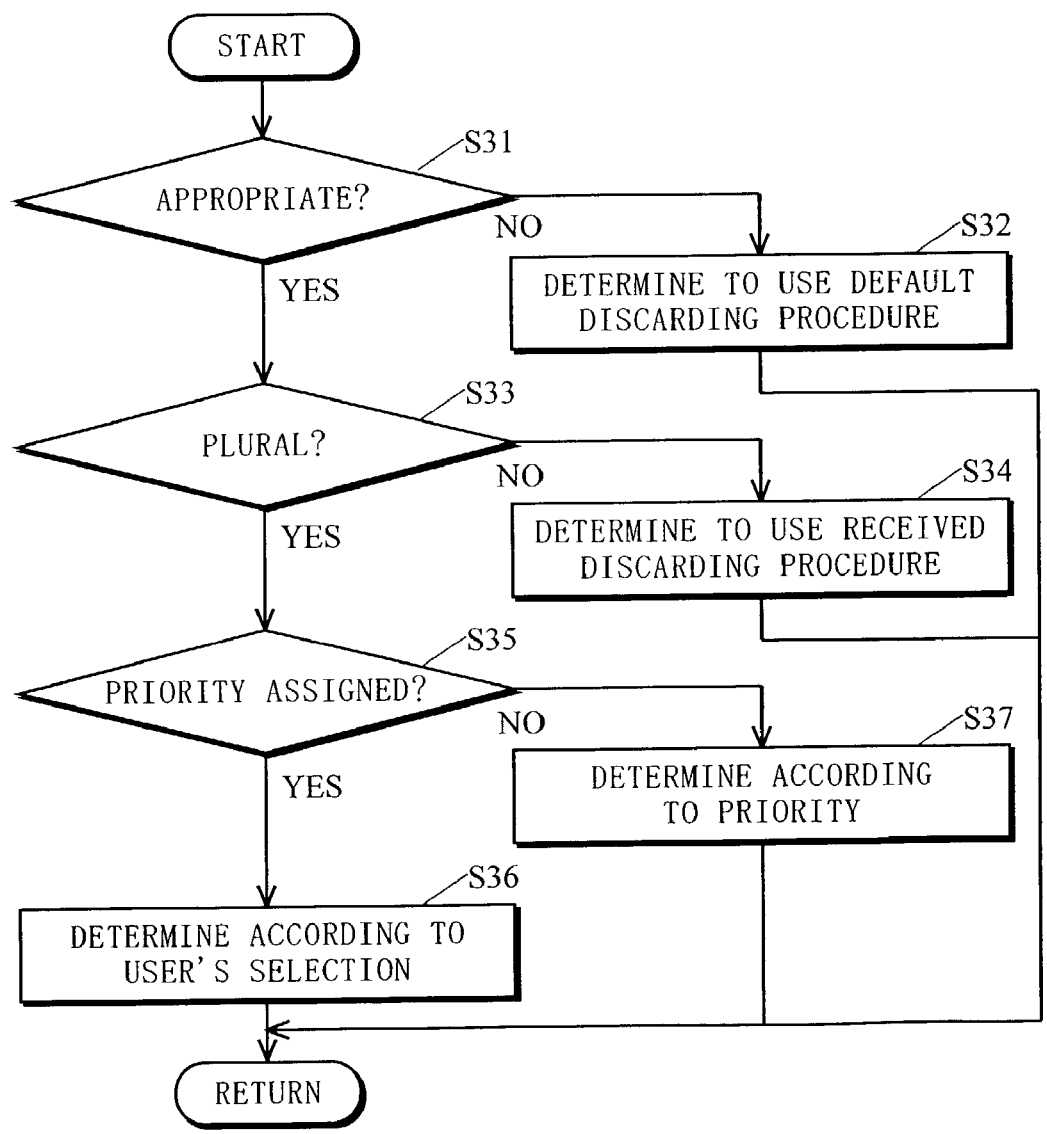
FIG. 9 is a flowchart showing details of step S22 of FIG. 8.

FIG. 9 is a flowchart showing details of step S22 of FIG. 8. The reception processing section 31 determines whether or not the discarding procedure information received in step S21 is appropriate (step S31). It is determined that the discarding procedure information is not appropriate if, for example, the discarding procedure information corresponding to the program has not been set by the program transmission apparatus side (only the program has been transmitted from the program transmission apparatus 1), or if the transmitted discarding procedure information is not usable by the program reception terminal 3. The discarding procedure information is not usable if it is in a form of a discarding program that is not operable by the program reception terminal 3, or an identifier specifying a discarding procedure that is not stored in the program reception terminal 3.

If it is determined in step S31 that the discarding procedure information is not appropriate, it is determined that the default discarding procedure information predetermined in the program reception terminal 3 is used as the discarding procedure information (step S32). Then, the discarding procedure determination process ends. If it is determined that the discarding procedure is appropriate, on the other hand, the reception processing section 31 determines whether or not a plurality of pieces of discarding procedure information have been received (step S33).

If it is determined in step S33 that a plurality of pieces of discarding procedure information have not been received, that is, only a single discarding procedure information has been received, it is determined that the discarding procedure information received in step S21 is used as the discarding procedure information (step S34). Then, the discarding procedure determination process ends. If it is determined in step S33 that a plurality of pieces of discarding procedure information have been received, on the other hand, the reception processing section 31 determines whether or not priorities have been set in the plurality of pieces of discarding procedure information (step S35).

If it is determined in step S35 that priorities have been set, the discarding procedure information for use is determined according to the priorities (step S36). Then, the discarding procedure determination process ends. If it is determined that no priorities have been set, the discarding procedure information for use is determined by a user's selection (step S37). At this time, the user issues a selecting instruction through the input section (not shown) included in the program reception terminal 3. The reception processing section 31 then determines the discarding procedure information according to the selecting instruction issued from the user. Alternatively, in step S37, the reception processing section 31 may determine the discarding procedure information based on criteria predetermined in the program reception terminal 3. With the above discarding procedure determination process, the discarding procedure information for use in a discarding process is determined.

Referring back to FIG. 8, following step S22, the reception processing section 31 stores the program received in step S21 and the discarding procedure information determined in step S22 in the reception-side storage section 34 (step S23). The program is stored in the program storage area 341. The discarding procedure information is stored in the discarding procedure information storage area 342. In the above example, the discarding procedure information with identifier "a" (refer to FIG. 3) is stored as the discarding procedure information for use. Note that, in step S23, the reception processing section 31 also causes the program received in step S21 and the discarding procedure determined in step S22 to be stored in relation to the relational information stored in the relational information storage area 343. The relational information may take any structure as long as the discarding procedure can be obtained therefrom based on the received program. For example, the relational information may be the same in structure as the relational information in the program transmission apparatus (refer to FIG. 5).

Following step S23, a program discarding-related process is performed (step S24). The program discarding-related process is to determine whether or not the program is to be discarded and, if it is to be discarded, to discard the program. The program discarding-related process is now described below in detail.

Figure 10:
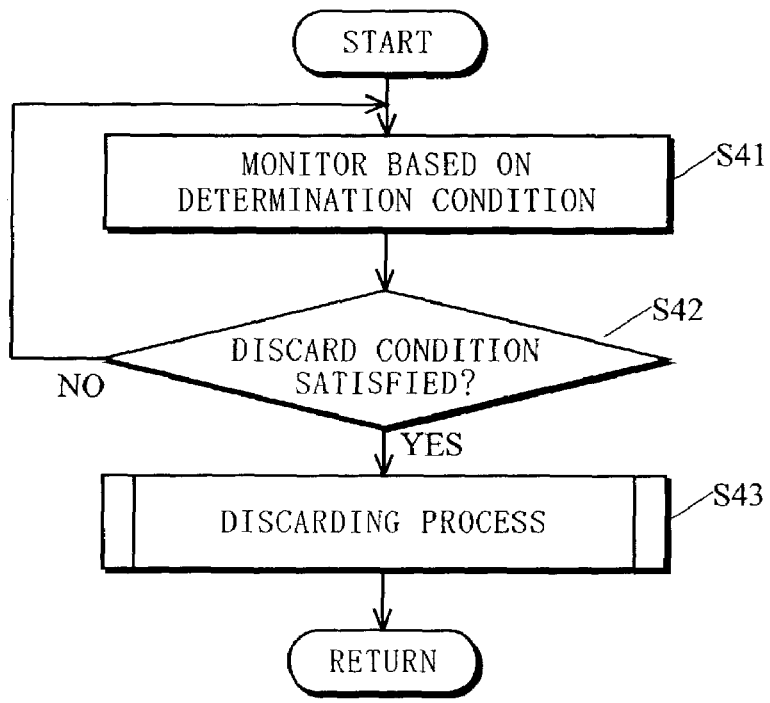
FIG. 10 is a flowchart showing details of step S24 of FIG. 8.

FIG. 10 is a flowchart showing details of step S24 in FIG. 8. First, the discard processing section 32 waits until the decision condition indicated by the discarding procedure stored in step S14 is satisfied (step S41). In the above example, the decision condition stipulates a regular action, that is, making a decision once a day. Therefore, if a decision is made at 10:00 a.m. everyday, for example, the discard processing section 32 waits until 10:00 a.m. everyday. Then, when the decision condition is satisfied in step S41 (when it is 10:00 a.m.), the procedure proceeds to step S42, where the discard processing section 32 determines whether or not the discard condition is satisfied. In the above example, the discard condition is that "a lapse of ten days after the program is received".

If the discarding procedure information does not include a decision condition, the discard processing section 32 may follow the decision condition of the predetermined default discarding procedure information (for example, the discarding procedure information with identifier "Z" shown in FIG. 2). Alternatively, the discard processing section 32 may go to step S42 upon a user's instruction.

Figure 11:
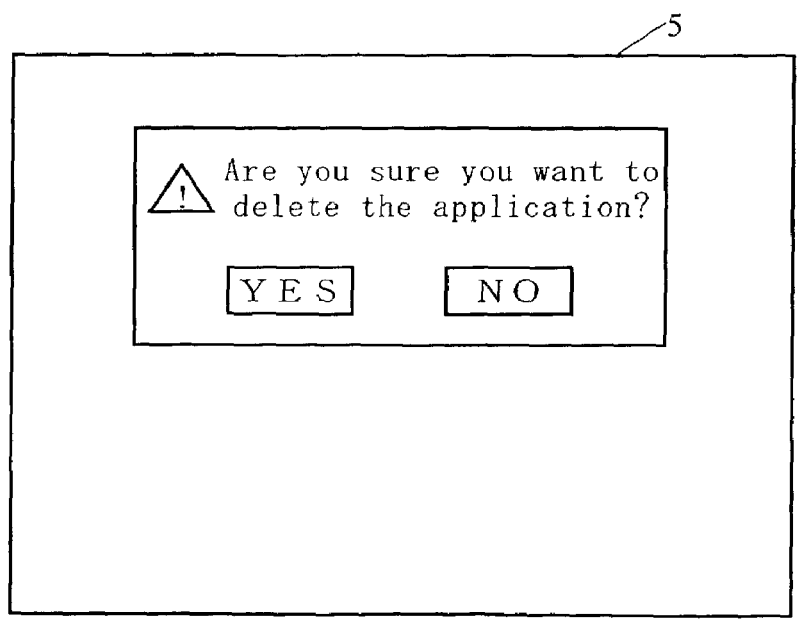
FIG. 11 is an illustration showing an exemplary pop-up display for discard confirmation in step S42 of FIG. 10.

If the discard condition is "user's approval", the discard processing section 32 waits for a user's approval in step S42. FIG. 11 is an illustration showing an exemplary pop-up display for the discard confirmation in step S42. In step S42, the discard processing section 32 causes a display of the program reception terminal 3 to display a pop-up as illustrated in FIG. 11, for example, for prompting the user for confirmation. In response, the user uses the input section (not shown) of the program reception terminal 3 to make an instruction for approving or not approving program discarding. When a user's approval is received, the discard processing section 32 determines that the discard condition has been satisfied. When a user's disapproval is received, the discard processing section 32 determines that the discard condition has not yet been satisfied.

If it is determined in step S42 that the discard condition has not been satisfied, the discard processing section 32 returns to step S41. That is, the discard processing section 32 waits until the discard condition is satisfied. On the other hand, if it is determined in step S42 that the discard condition has been satisfied, the discard processing section 32 performs a discarding process (step S43). The discarding process is to discard the program stored in the reception-side storage section 34. The discarding process is now described below in detail.

Figure 12:
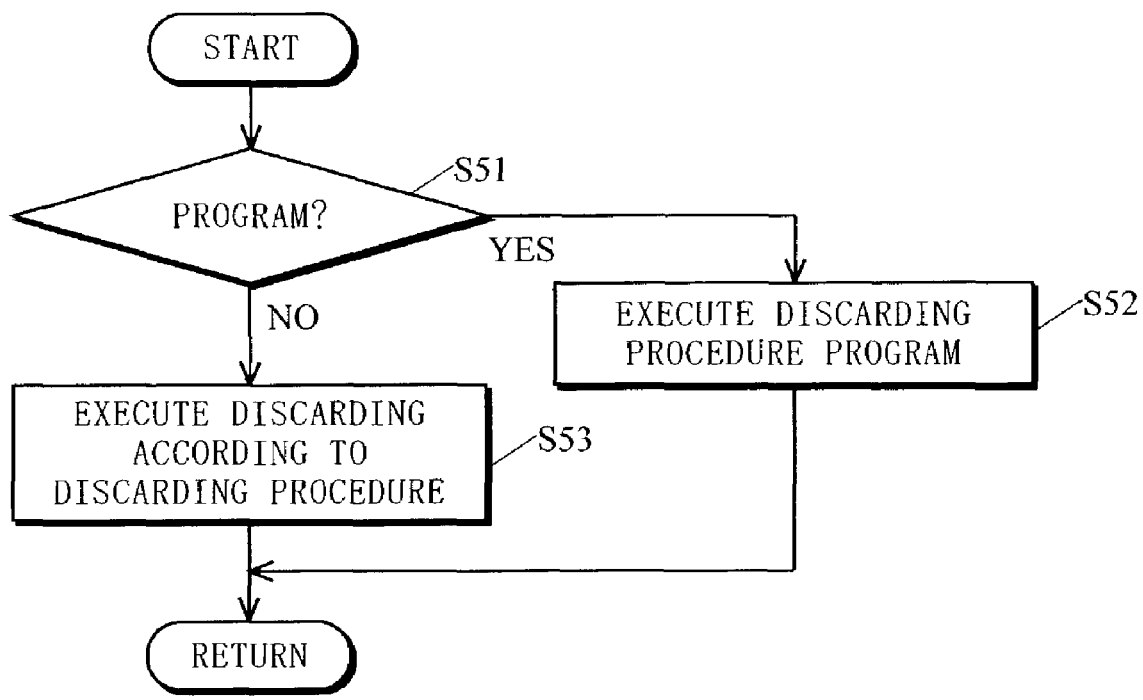
FIG. 12 is a flowchart showing details of step S43 of FIG. 10.

FIG. 12 is a flowchart showing details of step S43 in FIG. 10. First, the discard processing section 32 determines whether or not the discarding procedure information containing the discard condition determined in step S42 as having been satisfied is in a form of a discarding program (step S51). If it is determined that the discarding procedure information is in the form of a discarding program, the program reception terminal 3 executes this discarding program to discard the program stored therein (step S52). Then, the discarding process ends. If it is determined that the discarding procedure information is not in the form of a discarding program, that is, if the discarding procedure information is merely an identifier (and parameter values, in the present embodiment), the discard processing section 32 refers to the identifier to select the discarding procedure with the identifier from the discarding procedures stored in the discarding procedure information storage area 342 of the reception-side storage section 34 (step S53). Then, the discard processing section 32 discards the program according to the selected discarding procedure. Following step S53, the discard processing section 32 ends the discarding process. With this, the program is discarded, and the program receiving process in the program reception terminal 3 has been completed.

Note that, in the above description, the discarding program is a program only for discarding the program. In another embodiment, the discarding program may be a program for performing the discarding process of step S24. That is, with execution of the discarding program, the processes in steps S41 through S43 and steps S51 through S53 may be performed. In this case, since the determination in step S51 is always "Yes", step S51 may be omitted in the discarding process of step S43.

As such, according to the present embodiment, program discarding can be achieved with the discarding procedure compliant to the properties of the program. Furthermore, the discard condition can be freely changed at the program transmission apparatus side according to the program, thereby facilitating program management. Still further, programs that cannot be used or are no longer used can be automatically discarded at the program reception terminal side. This can eliminate programs taking up a lot of memory space.

Figure 13:
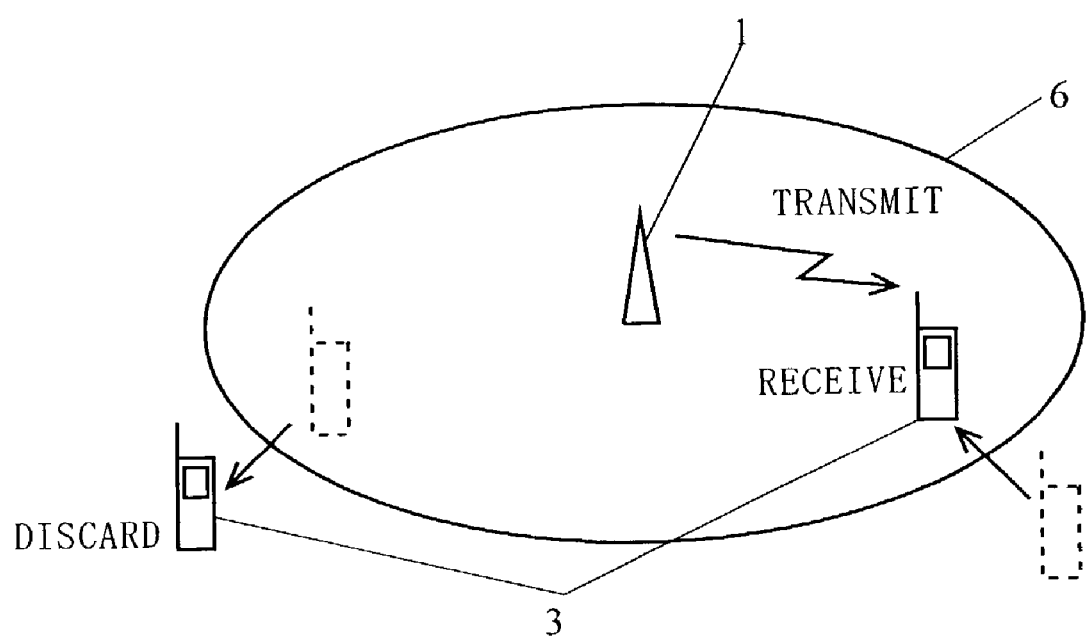
FIG. 13 is an illustration for describing an outline of an exemplary modification of the program distribution system according to the present embodiment.

An exemplary modification of the present embodiment is described below. FIG. 13 is an illustration for demonstrating an outline of the exemplary modification of the program distribution system according to the present embodiment. In FIG. 13, the program transmission apparatus 1 and the program reception terminal 3 are wirelessly communicable with each other. Therefore, the program and the discarding procedure information are wirelessly transmitted from the program transmission apparatus 1 to the program reception terminal 3. Also, an area 6 is an area (space) such as a so-called "hot spot". Within the area 6, the program reception terminal 3 can receive the program and the discarding procedure information from the program transmission apparatus 1. Exemplary communications in this program distribution system are short-range wireless communications using BLUETOOTH™, wireless LAN communications, and communications between cell phones (corresponding to the program reception terminal 3) and a base station (corresponding to the program transmission apparatus 1).

In the system of FIG. 13, the program transmission apparatus 1 transmits the program and the discarding procedure information to the program reception terminal 3 that has entered the area 6. Here, the program to be transmitted is a program that is supposed to be executed within the area 6, such as an application (program) for guiding users in a museum, and an application for enabling users in a business facility to see a map thereof. Such a program may be executable only within the area 6. Alternatively, the program may enable the program reception terminal 3 to communicate with the program transmission apparatus 1 while the program is executed. Still alternatively, the program may be forced to be terminated due to a network abnormality occurring when the program reception terminal 3 goes out of the area 6. In this case, when the program reception terminal 3 becomes unable to communicate with the program transmission apparatus 1, it is determined that a network abnormality occurred.

Also, the discarding procedure information transmitted from the program transmission apparatus 1 includes a condition such as that the program reception terminal 3 is not located within the area 6. That is, the program transmitted when the program reception terminal 3 enters the area 6 is discarded when the program reception terminal 3 goes out of the area 6. If the program is a program of which execution is terminated when the program reception terminal 3 goes out of the area 6, whether or not the program reception terminal 3 is located outside of the area 6 can be determined depending on whether the program is terminated. Also, if the program reception terminal 3 has a function of detecting its own position, such as a GPS (global positioning system), whether or not the program reception terminal 3 is located outside of the area 6 can be determined based on its position. In this case, the program reception terminal 3 may further include cartographic data, thereby making the above determination based on the cartographic data and the position of the program reception terminal 3.

With this, it is possible to effectively discard the program that is supposed to be executed within the area 6. That is, the program is assumed herein to be executed only within the area 6. Storing such a program even after the program reception terminal 3 goes out of the area 6 is a waste of the storage areas of the program reception terminal 3. Such a waste of the storage areas can be avoided by setting the discard condition to "the program reception terminal 3 is located outside of the area 6".

When the program is a program of which execution is forced to be terminated when the program reception terminal 3 goes out of the area 6, the discarding procedure information transmitted from the program transmission apparatus 1 preferably includes a condition that "whether to discard is decided at the time of terminating the program". With this, whether or not to discard the program is decided when the program is terminated, that is, when the program reception terminal 3 goes out of the area 6. Here, since the discard condition is "the program reception terminal 3 is not located within the area 6", the program is discarded. Therefore, the program is discarded immediately after the program reception terminal 3 goes out of the area 6. In this case, the unwanted program is promptly discarded, thereby enabling very efficient use of the storage areas of the program reception terminal 3.

As described above, the program distribution system according to the present invention is very effective in a system where a program that is supposed to be executed only within a specific area is distributed.

While the present invention has been described in detail, the foregoing description is in all aspects illustrative and not restrictive. It is understood that numerous other modifications and variations can be devised without departing from the scope of the present invention.

What is claimed is:

1. A program distribution system in which a program executable by a program reception terminal is distributed from a program transmission apparatus to said program reception terminal via a network,
   wherein said program transmission apparatus comprises a transmitting section for transmitting, to said program reception terminal, the program and discarding procedure information related to a discarding procedure for discarding the program in said program reception terminal;
   wherein said program reception terminal comprises:
      a program storage section for storing the program transmitted from said transmitting section; and
      a discarding section for discarding the program stored in said program storage section according to the discarding procedure specified by the discarding procedure information transmitted from said transmitting section;
   wherein the discarding procedure information includes a discard condition indicating that said program reception terminal is located outside of a predetermined area,
   wherein said discarding section includes:
      a discard determining section for determining whether or not the discard condition included in the discarding procedure information is satisfied with respect to the program stored in said program storage section; and
      a discard executing section for executing, when said discard determining section determines that the discard condition is satisfied, a discarding of the program stored in said program storage section; and
   wherein said transmitting section is operable to wirelessly transmit the program and the discarding procedure information to said program reception terminal that has entered the predetermined area to be able to wirelessly communicate with said program transmission apparatus.

2. The program distribution system according to claim 1, wherein:
   execution of the program is terminated when said program reception terminal goes out of the predetermined area; and
   said discard determining section is operable to determine whether or not said program reception terminal is located outside of the predetermined area based on whether the execution of the program is terminated.

3. The program distribution system according to claim 1, wherein:
   the discarding procedure information further includes a decision condition for determining whether or not the discard condition is satisfied; and when the decision condition included in the discarding procedure information is satisfied, said discarding determining section is operable to determine whether or not the discard condition is satisfied.

4. The program distribution system according to claim 3, wherein:
said program reception terminal further includes a program executing section for executing the program stored in said program storage section; and
the decision condition includes a condition related to a timing of executing the program by said program executing section.

5. The program distribution system according to claim 4, wherein the decision condition includes a condition that the program is activated by said program executing section.

6. The program distribution system according to claim 4, wherein the decision condition includes a condition that execution of the program by said program executing section is terminated.

7. The program distribution system according to claim 1, wherein said discard determining section is operable to determine whether or not the discard condition is satisfied at predetermined time intervals.

8. The program distribution system according to claim 1, wherein the discard condition includes a condition related to a lapse of time after the program transmitted from said transmitting section is received by said program reception terminal.

9. The program distribution system according to claim 1, wherein the discard condition includes a condition related to number of times the program transmitted from said transmitting section has been executed by said program reception terminal.

10. The program distribution system according to claim 1, wherein:
the discard condition includes a user's approval of discarding the program, and
said discard determining section is operable to receive the user's approval before said discarding section discards the program and, based on the received user's approval, decide whether the discard condition is satisfied.

11. The program distribution system according to claim 1, wherein:
the discarding procedure information is in a form of a discarding program for causing said program reception terminal to execute the discarding procedure; and
said discarding section is operable to discard the program by executing the discarding program.

12. The program distribution system according to claim 1, wherein:
the discarding procedure information indicates a procedure identifier given to the discarding procedure for identification;
said program reception terminal includes
a discarding procedure storage section for storing the discarding procedure, and
a selecting section for selecting the discarding procedure stored in said discarding procedure storage section based on the procedure identifier transmitted from said transmitting section; and
said discarding section is operable to discard the program according to the discarding procedure selected by said selecting section.

13. The program distribution system according to claim 1, wherein:
said discarding section includes
a default procedure storage section for storing a default discarding procedure that is previously set, and
a discarding procedure determining section for determining whether or not the discarding procedure indicated by the discarding procedure information transmitted from said transmitting section is to be executed by said program reception terminal; and
when said discarding procedure determining section determines that the discarding procedure is not to be executed, said discarding section is operable to discard the program according to the default discarding procedure stored in said default procedure storage section.

14. The program distribution system according to claim 1, wherein:
said discarding section includes
a default procedure storage section for storing a default discarding procedure that is previously set, and
a discarding procedure determining section for, determining whether or not the transmitted program is accompanied with discarding procedure information; and
when said discarding procedure determining section determines that the transmitted program is not accompanied with discarding procedure information, said discarding section is operable to discard the program according to the default discarding procedure stored in said default procedure storage section.

15. A program reception terminal for executing a program distributed from a program transmission apparatus via a network, said program reception terminal comprising:
a receiving section for receiving, when said program reception terminal has entered a predetermined area to be able to wirelessly communicate with the program transmission apparatus, a program and discarding procedure information related to a discarding procedure for discarding the program in said program reception terminal;
a program storage section for storing the program received by said receiving section; and
a discarding section for discarding the program stored in said program storage section according to the discarding procedure specified by the discarding procedure information received by said receiving section;
wherein the discarding procedure information includes a discard condition indicating that said program reception terminal is located outside of the predetermined area; and
wherein said discarding section includes:
a discard determining section for determining whether or not the discard condition included in the discarding procedure information is satisfied with respect to the program stored in said program storage section; and
a discard executing section for executing, when said discard determining section determines that the discard condition is satisfied, a discarding of the program stored in said program storage section.

16. A program transmission apparatus for transmitting a program executable by a program reception terminal from said program transmission apparatus to the program reception terminal via a network, said program transmission apparatus comprising:
a program storage section for storing the program to be executed by the program reception terminal;
a discarding procedure information storage section for storing discarding procedure information related to a discarding procedure to be performed by the program reception terminal for discarding the program; and
a transmitting section for transmitting, to the program reception terminal, the program stored in said program storage section and the discarding procedure information stored in said discarding procedure information storage section, wherein:

the discarding procedure information includes a discard condition indicating that the program reception terminal is located outside of a predetermined area; and said transmitting section is operable to wirelessly transmit the program and the discarding procedure information to the program reception terminal that has entered the predetermined area to be able to wirelessly communicate with said program transmission apparatus.

* * * * *